United States Patent
Wang

(10) Patent No.: US 12,380,441 B2
(45) Date of Patent: *Aug. 5, 2025

(54) FEDERATED CLOSED-LOOP SYSTEM

(71) Applicant: Visa International Service Association, San Francisco, CA (US)

(72) Inventor: Quan Wang, Foster City, CA (US)

(73) Assignee: Visa International Service Association, San Francisco, CA (US)

( * ) Notice: Subject to any disclaimer, the term of this patent is extended or adjusted under 35 U.S.C. 154(b) by 163 days.

This patent is subject to a terminal disclaimer.

(21) Appl. No.: 18/152,645

(22) Filed: Jan. 10, 2023

(65) Prior Publication Data
US 2023/0146705 A1 May 11, 2023

Related U.S. Application Data

(63) Continuation of application No. 16/650,339, filed as application No. PCT/US2018/053498 on Sep. 28, 2018, now Pat. No. 11,587,077.
(Continued)

(51) Int. Cl.
*G06Q 20/38* (2012.01)
*B67D 7/04* (2010.01)
(Continued)

(52) U.S. Cl.
CPC .......... *G06Q 20/3829* (2013.01); *B67D 7/04* (2013.01); *G06Q 20/027* (2013.01);
(Continued)

(58) Field of Classification Search
CPC ............ G06Q 20/3829; G06Q 20/027; G06Q 20/145; G06Q 20/3223; G06Q 20/40145;
(Continued)

(56) References Cited

U.S. PATENT DOCUMENTS 6,535,726 B1  3/2003 Johnson
7,516,147 B2  4/2009 Kranz et al.
(Continued)

FOREIGN PATENT DOCUMENTS

CN  106846666 A  *  6/2017
EP  3685603 A1  7/2020
(Continued)

OTHER PUBLICATIONS

Application No. EP18861962.1, Extended European Search Report, Mailed on Jun. 29, 2020, 9 pages.
(Continued)

*Primary Examiner* — Neha Patel
*Assistant Examiner* — Chunling Ding
(74) *Attorney, Agent, or Firm* — Kilpatrick Townsend & Stockton LLP

(57) ABSTRACT

Systems, methods, and computer readable media are for providing a hand free interaction between a user and a dispenser device. A mobile communication device and a beacon device associated with the dispenser device (or the dispenser device operating as a beacon device) may perform mutual authentication with a federated platform. Once the entities are authenticated, the user is allowed to dispense the resource utilizing the dispenser device. Data associated with the interaction and related to the resource dispensed may be provided to the federated platform via the mobile communication device and the interaction data may be recorded. The federated platform may subsequently provide the interaction data to a resource provider to enable the resource provider to conduct a settlement process.

20 Claims, 9 Drawing Sheets

Related U.S. Application Data

(60) Provisional application No. 62/566,015, filed on Sep. 29, 2017.

(51) Int. Cl.
| | |
|---|---|
| *G06Q 20/02* | (2012.01) |
| *G06Q 20/14* | (2012.01) |
| *G06Q 20/32* | (2012.01) |
| *G06Q 20/40* | (2012.01) |
| *H04L 67/125* | (2022.01) |

(52) U.S. Cl.
CPC ....... *G06Q 20/145* (2013.01); *G06Q 20/3223* (2013.01); *G06Q 20/40145* (2013.01); *H04L 67/125* (2013.01)

(58) Field of Classification Search
CPC ............... G06Q 20/02; G06Q 20/3278; G06Q 20/38215; H04L 9/50; H04L 9/3247; H04L 63/0869; H04L 63/0892; H04L 67/125; H04L 2209/56; H04L 9/3239; H04L 67/12; H04L 63/0823; H04W 12/47; H04W 4/20; H04W 4/80; H04W 12/06; B67D 7/04
See application file for complete search history.

(56) References Cited

U.S. PATENT DOCUMENTS

| | | | |
|---|---|---|---|
| 8,316,423 | B2 | 11/2012 | Nishimi |
| 9,519,901 | B1 | 12/2016 | Dorogusker |
| 9,723,003 | B1* | 8/2017 | Mcclintock ............. H04L 63/10 |
| 10,885,336 | B1 | 1/2021 | Davis et al. |
| 11,308,481 | B1* | 4/2022 | Thomas ........... G06Q 20/40155 |
| 2001/0020198 | A1 | 9/2001 | Wilson |
| 2002/0107809 | A1 | 8/2002 | Biddle et al. |
| 2002/0133420 | A1 | 9/2002 | McCoy et al. |
| 2003/0014372 | A1 | 1/2003 | Wheeler et al. |
| 2011/0023127 | A1 | 1/2011 | O'Donnell et al. |
| 2013/0246171 | A1* | 9/2013 | Carapelli ............. G06Q 20/325 705/14.51 |
| 2014/0075519 | A1* | 3/2014 | Porras ................... H04L 63/107 726/4 |
| 2015/0100152 | A1 | 4/2015 | Barragan et al. |
| 2015/0193895 | A1 | 7/2015 | Joao |
| 2015/0281187 | A1* | 10/2015 | Ogura ................... H04L 9/3247 713/171 |
| 2016/0012413 | A1 | 1/2016 | Chitilian et al. |
| 2016/0012414 | A1* | 1/2016 | Chitilian ............ G06Q 20/3227 705/76 |
| 2016/0019540 | A1 | 1/2016 | Tsutsui |
| 2016/0075242 | A1* | 3/2016 | Kim ........................ B60L 53/62 320/109 |
| 2017/0076274 | A1 | 3/2017 | Royyuru et al. |
| 2017/0178417 | A1 | 6/2017 | Bekas et al. |
| 2017/0193502 | A1 | 7/2017 | Mcquade et al. |
| 2017/0221065 | A1* | 8/2017 | Chitilian ............ G06Q 20/3227 |
| 2017/0243208 | A1 | 8/2017 | Kurian et al. |
| 2017/0374046 | A1 | 12/2017 | Narasimhan et al. |
| 2018/0089471 | A1* | 3/2018 | Chiarella ................ G06F 21/36 |
| 2018/0254898 | A1* | 9/2018 | Sprague ............... H04L 9/0637 |
| 2018/0330348 | A1* | 11/2018 | Uhr .................... G06Q 20/4014 |
| 2019/0089603 | A1* | 3/2019 | Harat ..................... H04L 67/12 |
| 2019/0163881 | A1 | 5/2019 | Matsudaira |
| 2019/0200276 | A1 | 6/2019 | Kinugawa et al. |
| 2020/0051074 | A1 | 2/2020 | Suh et al. |
| 2020/0236175 | A1 | 7/2020 | Wang |
| 2021/0027261 | A1 | 1/2021 | An et al. |
| 2021/0134103 | A1 | 5/2021 | Yamato et al. |
| 2022/0029823 | A1 | 1/2022 | Law et al. |

FOREIGN PATENT DOCUMENTS

| | | | |
|---|---|---|---|
| WO | 2013040169 A1 | 3/2013 | |
| WO | 2015019104 A2 | 2/2015 | |
| WO | WO-2015184306 A1 * | 12/2015 | .......... G06Q 20/145 |
| WO | 2017058794 A1 | 4/2017 | |

OTHER PUBLICATIONS

Application No. EP18861962.1, Office Action, Mailed on Jan. 3, 2022, 6 pages.

Application No. PCT/US2018/053498, International Search Report and Written Opinion, Mailed on Feb. 1, 2019, 13 pages.

Zhang et al., "Location-Based Authentication and Authorization Using Smart Phones", IEEE 11th International Conference on Trust, Security and Privacy in Computing and Communications, Jun. 2012, 8 pages.

* cited by examiner

FEDERATED CLOSED-LOOP SYSTEM

CROSS-REFERENCE TO RELATED APPLICATIONS

This application is a Continuation of U.S. patent application Ser. No. 16/650,339, filed Mar. 24, 2020, which is a 371 National Stage of International Patent Application No. PCT/US2018/053498, filed Sep. 28, 2018, which claims the benefit of the filing date of U.S. Provisional Application No. 62/566,015, filed Sep. 29, 2017. The above-named applications are incorporated by reference herein in their entireties.

BACKGROUND

In a typical interaction between a dispenser device and a user, the user physically interacts with the dispenser device in order to access a resource. For example, the user may take an access token such as a card from his or her possession. The access token is then used to physically interact with a dispenser. For example, the user may have a card and may insert it into the resource dispenser. Approvals are obtained, and the user is then allowed to access the resource. The access token provides security for the interaction since it provides certain authentication data (e.g., cryptograms) to the dispenser device, which a subsequent authorizing entity uses to determine if the user's access token is authentic. This helps to ensure that the interaction conducted between the user and the dispenser device is not fraudulent.

While such methods can be secure, conventional methods of interaction are cumbersome since they require the physical manipulation of an access token. Further, there may be a line of users waiting to utilize the dispenser device, because there may be too few available dispenser. Such conventional methods of interaction can also be slow and can frustrate users.

Embodiments of the invention address these and other problems, individually and collectively.

BRIEF SUMMARY

Embodiments of the disclosure are directed method and systems for hands free interaction at a specific location.

One embodiment of the invention is directed to a method including transmitting, from a beacon device associated with a dispenser device, a broadcast signal to a mobile communication device operated by a user. The broadcast signal may encode a first credential associated with a first entity (e.g., a resource provider). In some embodiments, the mobile communication device thereafter transmits the first credential to a federated platform and the federated platform determines if the beacon device is authentic and generates a first confirmation message confirming the authenticity of the beacon device. The method may further include receiving, by the beacon device, a second credential for the mobile communication device. The method may further include transmitting, by the beacon device, the received second credential to the federated platform. In some embodiments, the federated platform may determine if the mobile communication device is authentic and generate a second confirmation message confirming the authenticity of the mobile communication device. The method may further include receiving, by the beacon device from the federated platform, the second confirmation message indicating that the mobile communication device is authentic. In some embodiments, receiving the second confirmation message allows the dispenser device to dispense a resource for the user.

Another embodiment of the invention is directed to a dispenser device including one or more processors; and a memory including instructions that, when executed by the one or more processors. The instructions cause the dispenser device to transmit a broadcast signal to a mobile communication device operated by a user. The broadcast signal may encode a first credential associated with a first entity (e.g., a resource provider). In some embodiments, the mobile communication device thereafter transmits the first credential to a federated platform and the federated platform determines if the dispenser device is authentic and generates a first confirmation message confirming the authenticity of the beacon device. The instructions may further cause the dispenser device to receive a second credential for the mobile communication device. The instructions may further cause the dispenser device to transmit the received second credential to the federated platform. In some embodiments, the federated platform may determine if the mobile communication device is authentic and generate a second confirmation message confirming the authenticity of the mobile communication device. The instructions may further cause the dispenser device to receive, from the federated platform, the second confirmation message indicating that the mobile communication device is authentic. In some embodiments, receiving the second confirmation message allows the dispenser device to dispense a resource for the user.

These and other embodiments of the invention are described in further detail below.

DETAILED DESCRIPTION

Figure 1:
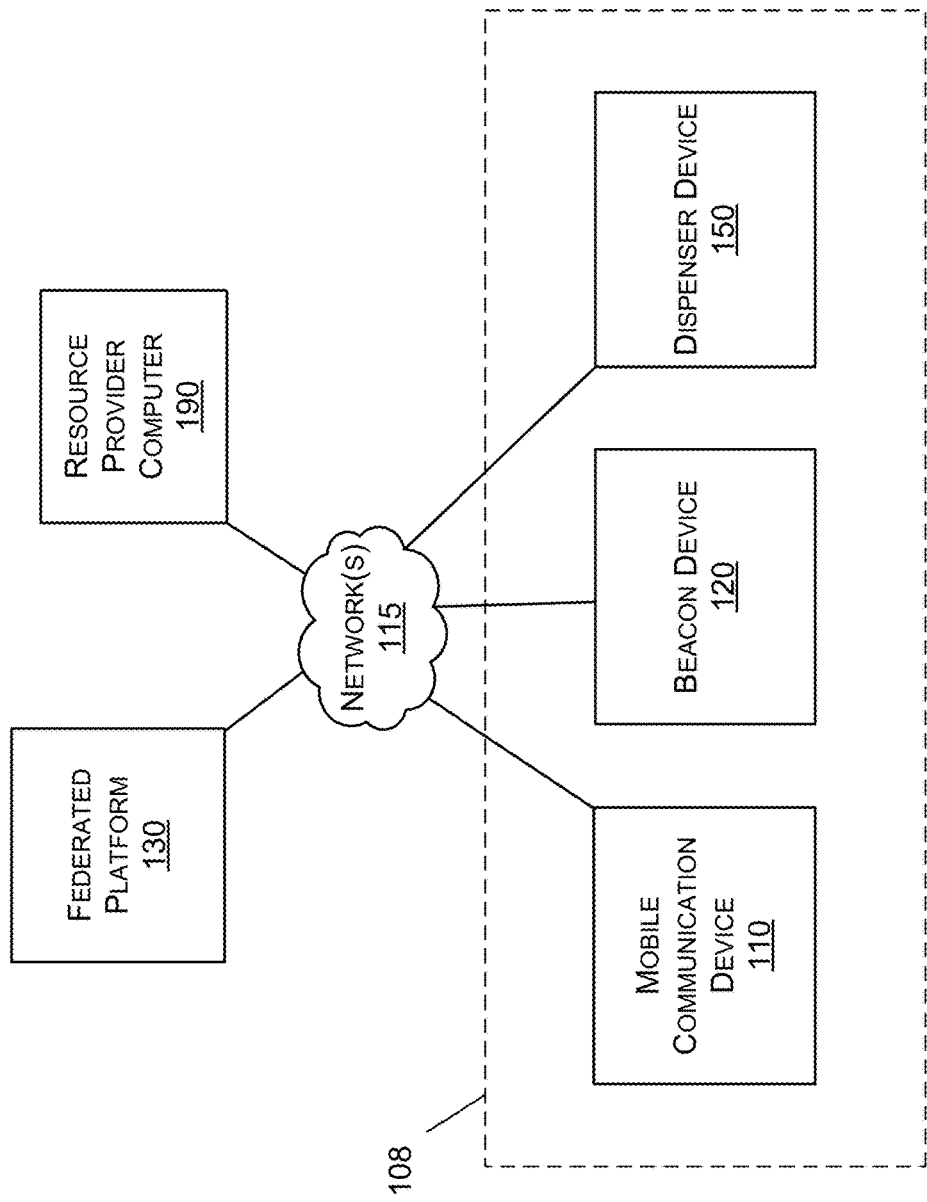
FIG. 1 depicts a block diagram of an exemplary system in accordance with at least one embodiment.

Some have suggested various ways of hands free interaction to improve the interaction speed between two interacting devices. For example, the user may have a mobile communication device that can interact with one or more broadcasting devices associated with a resource provider. The user's mobile communication device can pass credentials such as account numbers over the air to a wireless device operated by a resource provider, and the resource provider can finish the interaction with this information.

A number of problems exist with proposed hands free interaction systems. First, wireless signals from a variety of different sources can be received by a user's mobile communication device in a proposed hands free interaction system. The mobile communication device may have difficulty determining which signal is the one associated with the device with which the user wants to interact with. If the user transmits sensitive credentials on the user's mobile communication device to the wrong entity, the user's sensitive credentials can be stolen and used in a fraudulent manner. Second, the proposed hands free interaction method does not provide the same level of security as proposed interaction methods where a user needs to physically manipulate an access token to interact with an access device. For example, in a proposed hands free interaction system a device receiving an interaction signal from a mobile communication device, does not know if the user of that mobile communication device is in fact an authentic user. Third, proposed hands free interaction systems do not require the use of a human employed by the resource provider or require a specific physical interaction between an access token and an access device. Consequently, there are risks that the user may be able to obtain a resource without having paid or without having the resource obtained recorded in some way. Fourth, proposed hands free interactions involve payment transaction to be conducted via a payment processing system. This can add additional delay for the user as the user is required to wait for the transaction to be approved before being able to access the resource. Additionally, the processing of the payment transaction can be computationally burdensome. Nevertheless, proposed systems require payment authorization prior to enabling access to the resource.

Embodiments of the invention are directed to systems and methods for improving upon conventional interaction systems. In some embodiments, a beacon device associated with a dispenser device (or the dispenser device itself) may transmit a broadcast signal to a mobile communication device operated by a user. The broadcast signal may encode a first credential associated with a first entity (e.g., a resource provider). In some embodiments, the mobile communication device may thereafter transmit the first credential to a federated platform and the federated platform may determine if the beacon device (or dispenser device) is authentic. The federated platform may generate a first confirmation message confirming the authenticity of the beacon device (or dispenser device). The beacon device or dispenser device may receive a second credential for the mobile communication device. The second credential may be transmitted by the beacon device or dispenser device to the federated platform. In some embodiments, the federated platform may determine if the mobile communication device is authentic and generate a second confirmation message confirming the authenticity of the mobile communication device. The beacon device or dispenser device may receive from the federated platform the second confirmation message indicating that the mobile communication device is authentic. In some embodiments, receiving the second confirmation message may allow the dispenser device to dispense a resource for the user.

Prior to discussing the details of some embodiments of the present invention, description of some terms may be helpful in understanding the various embodiments.

A "credential" may include any evidence of authority, rights, or entitlement to privileges. In some embodiments, a credential for an entity may be a public key of a public/private key pair, where only the entity is in possession of the private key of the public/private key pair. In some embodiments, a credential may be one that has been validated by an authentication system (e.g., a federated platform that provides authentication functionality). For example, a credential may be a public key that has been signed by a private key of the authentication system to form a digital signature. The credential could also be a combination of the public key and the digital signature. The public key may be used to identify a particular entity, and the digital signature may serve as proof that the authentication system previously verified by entity.

A "federated platform" may be any suitable number of electronic devices that provide authentication and/or recordation functionality. In some embodiments, a federated platform may be configured to maintain a blockchain that includes credentials corresponding to a mobile communication device, a user, a beacon device, a dispenser device, or the like. The federated platform may further be configured to record interaction data (e.g., a total value corresponding to a total amount of a dispensed resource, a user identifier and/or credential associated with a user in receipt of the dispensed resource, an identifier/credential associated with a dispenser device from which the resource was dispensed, a resource provider identifier, etc.) within the blockchain. The federated platform may be configured to determine whether a user, mobile communication device, beacon device, and/or dispenser device is authentic based at least in part on comparing a credential purportedly associated with one of these devices and a credential stored in the blockchain. The federated platform may generate and transmit confirmation messages indicating whether or not the entity associated with the credential provided is authentic. In some embodiments, the federated platform may provide confirmation that provided interaction data was successfully stored in the blockchain. In some embodiments, the federated platform may provide the interaction data to any suitable electronic device (e.g., a resource provider computer).

A "blockchain" can be a distributed database that maintains a continuously-growing list of records secured from tampering and revision. A blockchain may include a number of blocks of interaction records recorded on one or more nodes. Each block in the blockchain can contain also include a timestamp and a link to a previous block. For example, each block may include or be appended to a hash of the previous block. Stated differently, interaction records in a blockchain may be stored as a series of "blocks," or permanent files that include a record of a number of transactions occurring over a given period of time. Blocks may be appended to a blockchain by an appropriate node after it completes the block and the block is validated. In embodiments of the invention, a blockchain may be distributed, and a copy of the blockchain may be maintained at each node in a blockchain network.

A "key" may refer to a piece of information that is used in a cryptographic algorithm to transform input data into another representation. A cryptographic algorithm can be an encryption algorithm that transforms original data into an alternate representation, or a decryption algorithm that transforms encrypted information back to the original data. Examples of cryptographic algorithms may include triple data encryption standard (TDES), data encryption standard (DES), advanced encryption standard (AES), etc. A "signed key" may include a public key that has been digitally signed by a private key.

A "public/private key pair" may refer to a pair of linked cryptographic keys generated by an entity. The public key may be used for public functions such as encrypting a message to send to the entity or for verifying a digital signature which was supposedly made by the entity. The private key, on the other hand may be used for private functions such as decrypting a received message or applying a digital signature. In some embodiments, the public key may be authorized by a body known as a Certification Authority (CA) which stores the public key in a database and distributes it to any other entity which requests it. In some embodiments, the public key may be generated by another entity. The private key will typically be kept in a secure storage medium and will usually only be known to the entity. However, the cryptographic systems described herein may feature key recovery mechanisms for recovering lost keys and avoiding data loss. Public and private keys may be in any suitable format, including those based on Rivest-Shamir-Adleman (RSA) or elliptic curve cryptography (ECC).

A "resource provider" may be an entity that can provide a resource such as goods, services, information, and/or access. Examples of a resource provider include merchants, access devices, secure data access points, etc. A "merchant" may typically be an entity that engages in transactions and can sell goods or services, or provide access to goods or services.

A "resource provider computer" may be any suitable electronic device operated by, or on behalf of, a resource provider. In some embodiments, a resource provider computer may be configured to receive interaction data (e.g., from a federated platform). According to some embodiments, the resource provider computer may be configured to initiate a billing process and/or a payment authorization process for obtaining payment for a resource dispensed by a dispenser device associated with the resource provider.

A "server computer" may include a powerful computer or cluster of computers. For example, the server computer can be a large mainframe, a minicomputer cluster, or a group of servers functioning as a unit. In one example, the server computer may be a database server coupled to a Web server. The server computer may include one or more computational apparatuses and may use any of a variety of computing structures, arrangements, and compilations for servicing the requests from one or more client computers.

A "mobile communication device" may include any electronic device that may be transported and operated by a user, which may also provide remote communication capabilities to a network. Examples of remote communication capabilities include using a mobile phone (wireless) network, wireless data network (e.g. 3G, 4G or similar networks), Wi-Fi, Bluetooth, Bluetooth Low Energy (BLE), Wi-Max, or any other communication medium that may provide access to a network such as the Internet or a private network. Examples of mobile communication devices include mobile phones (e.g. cellular phones), PDAs, tablet computers, net books, laptop computers, wearable devices (e.g., watches), vehicles such as automobiles and motorcycles, personal music players, hand-held specialized readers, etc. A mobile communication device may include any suitable hardware and software for performing such functions, and may also include multiple devices or components (e.g. when a device has remote access to a network by tethering to another device—i.e. using the other device as a modem—both devices taken together may be considered a single mobile communication device).

A "beacon device" can include a hardware transmitter that can broadcast their identity to nearby mobile communication devices. A beacon device can enable smartphones and tables and other devices to perform actions when in proximity to the beacon device. An example of a beacon device can be a BLE beacon. A BLE beacon is a wireless device that periodically broadcast a Bluetooth Low Energy advertising packet, that is received by a smartphone and used to determine the position with respect to the beacon itself. The advertising packet can include a UUID, a major ID, and minor ID. The UUID may correspond to a particular entity such as a resource provider, and an application on a mobile communication device may be configured to recognize the UUID. Major IDs may correspond to a specific location (e.g., a resource provider location) identifier, and a minor ID may correspond to a specific sublocation (e.g., a subarea of the resource provider location) within the location. In some embodiments, a beacon device may be a standalone device situated near or at a dispenser device, while in other embodiments, a dispenser device may include a beacon device.

A "dispenser device" may include any electronic device that may manage access and/or dispensing of a resource, which may also include remote communication capabilities. Example dispenser devices may include fuel dispensers, candy machines, soda machines, slot machines, or the like. A "resource" may include any physical or digital item that may be dispensed by a dispenser device. Example resources include fuel, candy, soda, game access, and the like. In some embodiments, a dispenser device may be configured to perform various operations for managing access to and dispersing of a resource. The dispenser device may be configured to track/monitor the amount of the resource dispersed and calculate a total value corresponding to the amount of the resource dispersed. The dispenser device may be configured to transmit information associated with the dispersing of the resource to any suitable device (e.g., a mobile communications device associated with a user). In some embodiments, the dispenser device may be an example of a beacon device. Accordingly, in some embodiments, the dispenser device may perform operations related to dispensing as well as the broadcast signal processing discussed above in connection with a beacon device.

A "transaction processing computer" may include a network of one or more devices that can process and route transaction request messages. An exemplary transaction processing computer may include data processing subsystems, networks, and operations used to support and deliver authorization services, exception file services, transaction scoring services, and clearing and settlement services. An exemplary transaction processing system may include VisaNet™. Transaction processing systems such as VisaNet™ are able to process credit card transactions, debit card transactions, and other types of commercial transactions. VisaNet™, in particular, may include a VIP system (Visa Integrated Payments system) which processes authorization requests and a Base II system which performs clearing and settlement services.

An "authorizing entity" may be an entity that authorizes a request. Examples of an authorizing entity may be an issuer, a governmental agency, a document repository, an access administrator, etc. An "authorizing entity computer" may be a computer operated by or associated with an authorizing entity and may be implemented by, for example, a server computer.

An "issuer" may typically refer to a business entity (e.g., a bank) that maintains an account for a user. An issuer may also issue payment credentials stored on communications devices.

An "authorization request message" may be a message that requests permission to conduct an interaction. For example, an authorization request message may include an electronic message that is sent to a payment processing network and/or an issuer of a payment card to request authorization for a transaction. An authorization request message according to some embodiments may comply with (International Organization of Standardization) ISO 8583, which is a standard for systems that exchange electronic transaction information associated with a payment made by a consumer using a payment device or payment account. The authorization request message may include an issuer account identifier that may be associated with a payment device or payment account. An authorization request message may also include additional data elements corresponding to "identification information" including, by way of example only: a service code, a CVV (card verification value), a dCVV (dynamic card verification value), an expiration date, etc. An authorization request message may also include "transaction information," such as any information associated with a current transaction, such as the transaction amount, merchant identifier, merchant location, etc., as well as any other information that may be utilized in determining whether to identify and/or authorize a transaction.

An "authorization response message" may be an electronic message reply to an authorization request message. In some embodiments, it may be generated by an issuing financial institution or a payment processing network. The authorization response message may include, by way of example only, one or more of the following status indicators: Approval—transaction was approved; Decline—transaction was not approved; or Call Center—response pending more information, merchant must call the toll-free authorization phone number. The authorization response message may also include an authorization code, which may be a code that a credit card issuing bank returns in response to an authorization request message in an electronic message (either directly or through the payment processing network) to the merchant's access device (e.g. POS equipment) that indicates approval of the transaction. The code may serve as proof of authorization. As noted above, in some embodiments, a payment processing network may generate or forward the authorization response message to the merchant.

The term "verification" and its derivatives may refer to a process that utilizes information to determine whether an underlying subject is valid under a given set of circumstances. Verification may include any comparison of information to ensure some data or information is correct, valid, accurate, legitimate, and/or in good standing.

Details of some embodiments of the present invention will now be described.

FIG. 1 shows a block diagram of a system 100 according to an embodiment of the invention. The system can include a number of devices at a location 108. The location 108 may be any suitable defined area including a location associated with a resource provider, a fueling station location, or any other suitable interaction location.

In the location 108, an interaction between an entity associated with the location 108 and a user may take place. For example, in some embodiments, the entity may be a resource provider such as a merchant and the user may be a consumer of that merchant. The merchant and the consumer may interact with each other at the location 108 to perform a dispersing interaction or any other suitable interaction. The user may operate a mobile communication device 110 while the resource provider may operate a beacon device 120 and/or a dispenser device 150. In some embodiments, the beacon device 120 may be a separate device from the dispenser device 150. Although depicted in FIG. 1 as separate device, the dispenser device 150 may include the dispenser device 150 and/or the dispenser device 150 may also operate as the beacon device 120 to perform the functionality associated with a dispenser device as well as the functionality associated with a beacon device. Although one beacon device 120 and one mobile communication device 110 are illustrated, there can be many more of them at the location 108. Similarly, although one dispenser device 150 is illustrated, there may be more than one dispenser device 150 at the location 108. As will be described in detail below, the beacon device 120 and/or the dispenser device 150 and the mobile communication device 110 may be in short range communication with each other. For example, the beacon device 120, the dispenser device 150, and the mobile communication device 110 may communicate with each other using a Bluetooth Low Energy (BLE) communications protocol via network(s) 115. The network(s) 115 may include any suitable wireless and/or wired communications network. In some embodiments, the mobile communication device 110, the dispenser device 150 and/or the beacon device 120 may communicate with each other if they are within about 100 meters, 50 meters, or even 10 meters of each other, but may not communicate with each other outside of these ranges.

Although this example describes the use of a BLE communications protocol, it is understood that embodiments of the invention may utilize any suitable wireless communication mechanism. Examples of such communication mechanisms may include the use of a suitable electrical, electromagnetic, or even acoustic mode of communication. For example, embodiments of the invention may use RF, IR, or even audio signals to transmit data to and from two devices in a wireless manner. Preferred communication mechanisms include short-to-medium range wireless communication mechanisms. Examples of communication mechanisms may include Wi-Fi, BLE, classic Bluetooth, etc.

In some embodiments, BLE technology is used as the short range communication protocol or technology. Bluetooth Low Energy is a wireless personal area network technology used for transmitting data over short distances. It is designed for low energy consumption and cost, while maintaining a communication range similar to classic Bluetooth. BLE communication consists primarily of "advertisements," or small packets of data, broadcast at a regular interval by beacons (which may be present in or be a base station) or other BLE enabled devices via radio waves.

The system may also include a number of components that are remote from the location 108. Such components may include a federated platform 130, which may be in operative communication with the beacon device 120 (or the dispenser device 150 if the dispenser device 150 is operating at least in part as a beacon device) and the mobile communication device 110.

A resource provider computer 190 may be in communication with the federated platform 130 via the network(s) 115. The resource provider computer 190, the beacon device 120, and the dispenser device 150 may individually be associated with a common resource provider.

The various devices, components, and entities in FIG. 1 may communicate using any suitable types of communications networks (e.g., network(s) 115). Network(s) 115 may include a plurality of networks for secure communication of data and information between entities. In some embodiments, network(s) 115 may follow a suitable communication protocol to generate one or more secure communication channels. A communication channel may in some instances include a "secure communication channel," which may be established in any known manner, including the use of mutual authentication and a session key and establishment of an SSL session. However, any method of creating a secure channel may be used. By establishing a secure channel, sensitive information may be securely transmitted.

Any suitable communications protocol may be used for generating a communications channel. Suitable communications networks may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like.

Messages between the computers, networks, and devices described in system 100 may be transmitted using a secure communications protocols such as, but not limited to, File Transfer Protocol (FTP); HyperText Transfer Protocol (HTTP); Secure Hypertext Transfer Protocol (HTTPS), Secure Socket Layer (SSL), ISO (e.g., ISO 8583) and/or the like.

Figure 2:
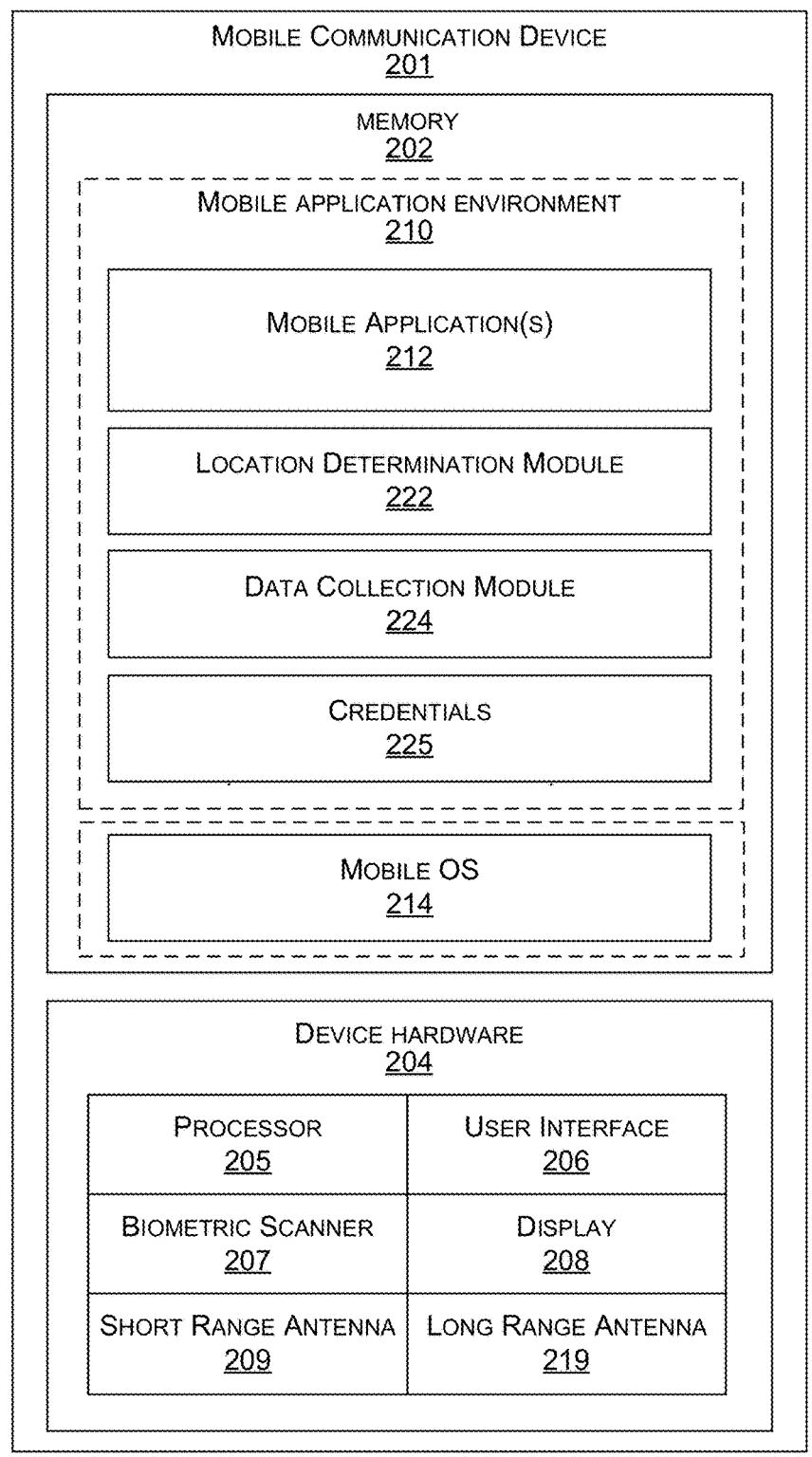
FIG. 2 shows a diagram of a mobile communication device in accordance with at least one embodiment.

FIG. 2 illustrates a mobile communication device 201 according to an embodiment of the invention. Mobile communication device 201 may be an example of the mobile communication device 110 of FIG. 1. Mobile communication device 201 may include device hardware 204 coupled to a memory 202.

Device hardware 204 may include a processor 205, a short range antenna 209, a long range antenna 219, a biometric scanner 207, a user interface 206, and a display 208 (which may be part of user interface 206). The processor 205 can be implemented as one or more integrated circuits (e.g., one or more single core or multicore microprocessors and/or microcontrollers), and is used to control the operation of mobile communication device 201. Processor 205 can execute a variety of programs in response to program code or computer-readable code stored in memory 202, and can maintain multiple concurrently executing programs or processes. Short range antenna 209 may include one or more RF transceivers and/or connectors that can be used by mobile communication device 201 to communicate with other devices and/or to connect with external networks. User interface 206 can include any combination of input and output elements to allow a user to interact with and invoke the functionalities of mobile communication device 201. In some embodiments, display 208 may be part of user interface 206. The biometric scanner 207 may be configured to capture any suitable biometric including a fingerprint, retina, facial image, etc. The short range antenna 209 may be configured to communicate with external entities through a short range communication medium (e.g., using Bluetooth, Wi-Fi, infrared, NFC, etc.). The long range antenna 219 may be configured to communicate with a remote base station and a remote cellular or data network, over the air.

Memory 202 can be implemented using any combination of any number of non-volatile memories (e.g., flash memory) and volatile memories (e.g., DRAM, SRAM), or any other non-transitory storage medium, or a combination thereof media. Memory 202 may store a mobile OS 214 and a mobile application environment 210 where one or more mobile applications 212 operate (e.g., an application associated with resource dispensing, an application associated with the resource provider, a web browser, etc.) to be executed by processor 205.

Also, the memory 202 may store computer code, executable by the processor 205, for performing any of the functions described herein.

Memory 202 may also store a location determination module 222, a data collection module, as well as credentials.

The location determination module 222 may include instructions for determining a location of the mobile communication device 201.

Memory 202 may also store a data collection module 224. The data collection module 224 may include instructions for collecting data prior to transmitting that data to a beacon device (e.g., the beacon device 120 of FIG. 1, the dispenser device 150 of FIG. 1 operating at least in part as a beacon device, etc.). In some embodiment, the data collection module may include instructions for causing the processor 205 to gather credentials 225 and store the credentials 225 in memory 202. Credentials 225 may include information identifying the mobile communication device 201 and/or the user of the mobile communication device. Example of credentials may include a public key associated with the mobile communication device 201 and/or a user of the mobile communication device 201, a digital signature (e.g., the public key of the mobile communication device 201 signed by a key of the authentication system), biometric data (e.g., biometric samples or templates), etc. In some embodiments, the credentials 225 may include a PIN, and/or a password, and/or biometric samples (e.g., fingerprint(s), retina scan(s), iris scan(s), a facial image, or the like) provided by the user at the mobile communication device 201.

In some embodiments, the data collection module 224 may be configured to receive interaction data from a dispenser device (e.g., the dispenser device 150 of FIG. 1). In some embodiments, the interaction data may include a total value corresponding to a total amount dispensed for a particular resource managed by the dispenser device and, in some cases, a credential/identifier associated with the dispenser device (or the resource provider associated with the dispenser device).

Based at least in part on receipt of the interaction data, the data collection module 224 may be configured to elicit biometric samples from a user of the mobile communication device 201 utilizing the biometric scanner 207 or any suitable sensor such as a camera, fingerprint reader, retina scanner, iris scanner, or the like. The biometric samples captured from the user via the biometric scanner 207 (or other suitable sensor) may be authenticated by the data collection module 224 based at least in part on any suitable authentication method such as comparing the biometric sample to previously stored credential 225 (e.g., biometric samples collected at the mobile communication device 201. In some embodiments, based at least in part on receipt of the interaction data, the data collection module 224 may be configured to elicit user input such as a PIN and/or password via the user interface 206 which may be then compared to credential 225 (e.g., a previously stored PIN and/or password) to authenticate the user at the mobile communication device 201.

In some embodiments, the data collection module 224 may be configured to add a user credential and/or suitable identifier for identifying the user in receipt of the dispensed resource to the interaction data and transmit the combined interaction data to a federated platform (e.g., the federated platform 130 of FIG. 1). In at least one embodiment, the data collection module 224 may be configured to receive an indication that the interaction data was received and/or recorded at the federated platform 130 and may cause the indication to be provided at the display 208, potentially via user interface 206.

In some embodiments, the data collection module 224 may be configured to receive a broadcast signal (e.g., from beacon device 120 and/or from dispenser device 150 of FIG.

1 operating as a beacon device) that encodes a credential (e.g., a credential associated with the beacon device 120 or the dispenser device 150). Upon receipt of the credential, the data collection module 224 may be configured to transmit the credential to a federated platform (e.g., the federated platform 130 of FIG. 1) which in turn may be configured to determine whether the beacon device 120/dispenser device 150 is authentic. The data collection module 224 may be configured to receive a confirmation message from the federated platform indicating whether or not the beacon device 120/dispenser device 150 corresponding to the provided credential is authentic. In some embodiments, when the confirmation message indicates that the beacon device 120/dispenser device 150 is authentic, the data collection module 224 may be configured to transmit one or more of credentials 225 to the beacon device 120/dispenser device 150. In some embodiments, the data collection module 224 may be configured to transmit one or more of credentials 225 at any suitable time, not necessarily in response to receiving a confirmation message.

Figure 3:
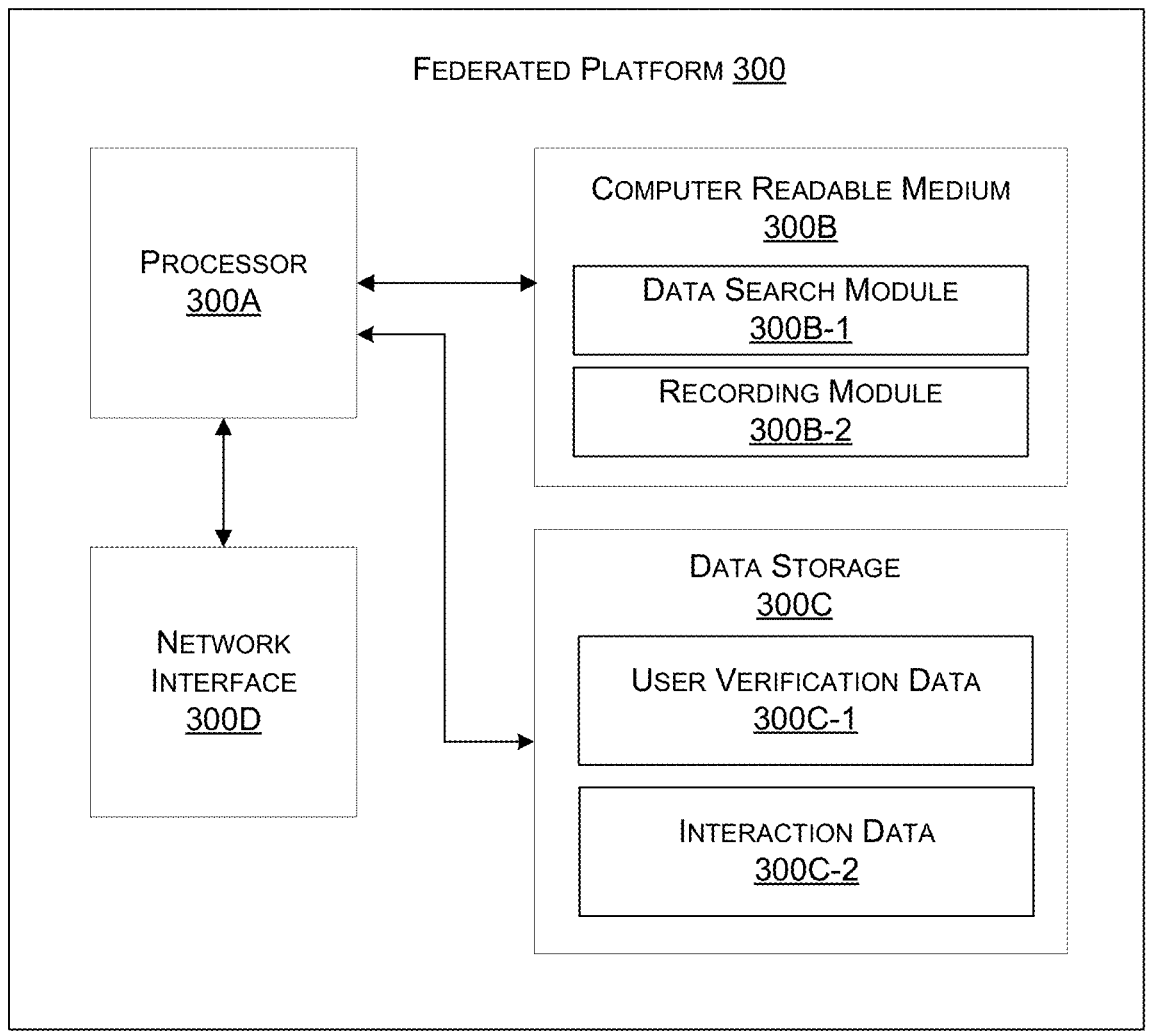
FIG. 3 shows a block diagram of federated platform in accordance with at least one embodiment.

FIG. 3 shows a block diagram illustrating some components in a federated platform 300 (e.g., the federated platform 130 of FIG. 1). The federated platform 300 may have one or more processors 300A, coupled to a computer readable medium 300B, data storage 300C, and network interface 300D. As depicted, the federated platform 300 may include a single electronic device, or the federated platform 300 may include many devices individually including one or more processors, coupled to a computer readable mediums, data storage, and a network interface.

The computer readable medium 300B may include a data search module 300B-1 and a recording module 300B-2. The data search module 300B-1 may include instructions for causing the one or more processors 300A to search for user verification data 300C-1 in the data storage 300C and to verify that a purported user is in fact authentic and registered with the federated platform 300. The recording module 300B-2 may include instructions for causing the one or more processors 300A to register entities in the federated platform 300, and recording user verification data 300C-1 and/or interaction data 300C-2 to the data storage 300C. In some embodiments, the user verification data 300C-1 may include credentials associated with a mobile communication device (e.g., credentials 225 of FIG. 2), a user, a beacon device, and/or a dispenser device. In some embodiments, the interaction data 300C-2 may include a total value corresponding to a total amount dispensed for a particular resource, a user credential and/or suitable identifier for identifying the user in receipt of the dispensed resource, or the like. The data storage 300C may be in the form of a blockchain such as the blockchain 400 discussed below in connection with FIG. 4.

In some embodiments, the federated platform 300 may be in the form of a central computer system. In other embodiments, the federated platform 130 may be in the form of a distributed network of nodes (e.g., computing devices). In such embodiments, the federated platform 130 may continually update the data storage 300C (e.g., the blockchain) and stored within the individual nodes.

Figure 4:
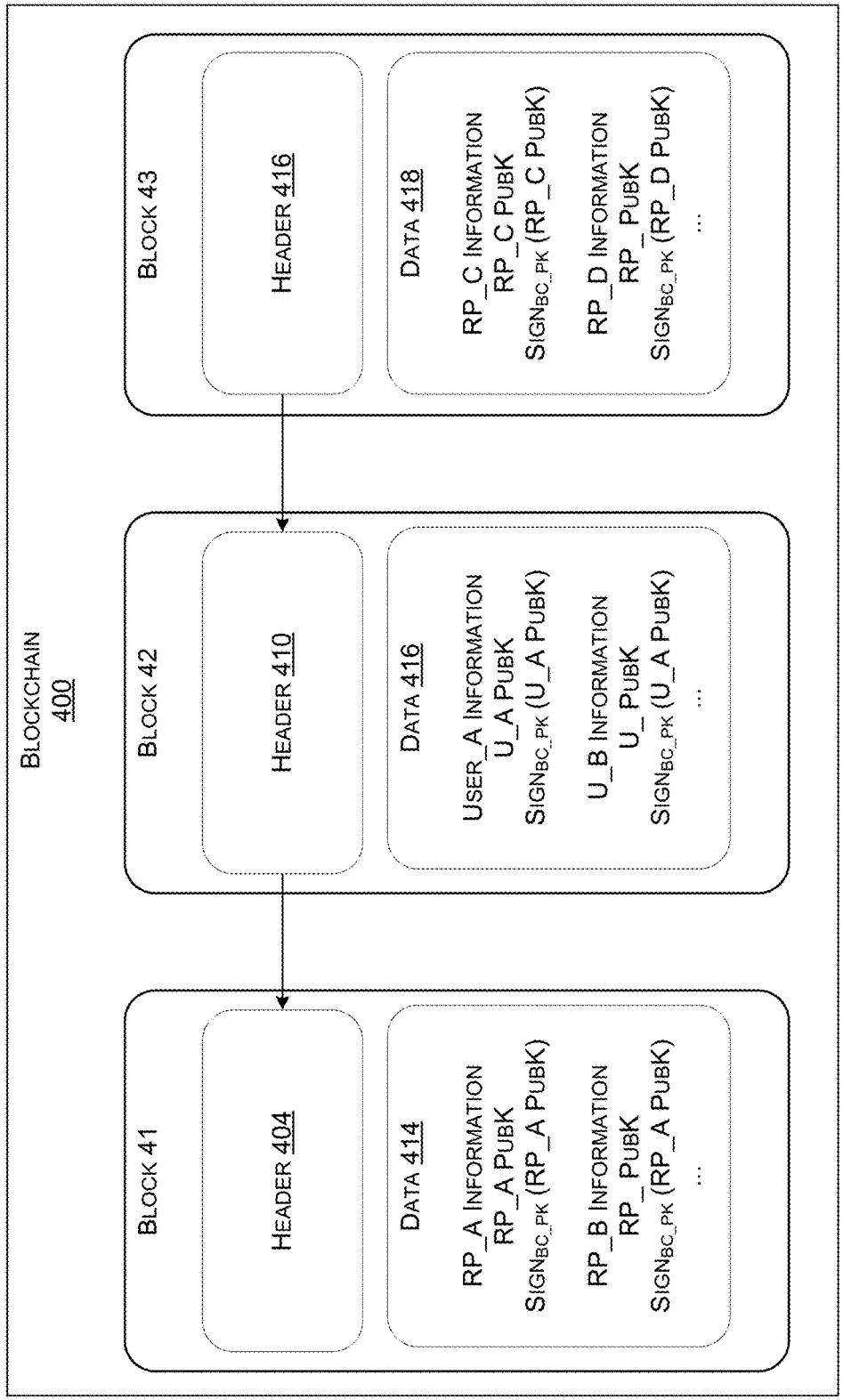
FIG. 4 shows an example of a portion of a blockchain in accordance with at least one embodiment.

FIG. 4 shows an example of a portion of a blockchain 400, which may include a number of blocks 41, 42, 43, each block including respective headers 404, 4010, 416. Each header may include data elements including version numbers, previous block hashes, merkle roots, and timestamps. Each block may also include data including information about each entity being registered (e.g., name, address, phone number, e-mail address, etc.), an identifier for the entity (e.g., a public key of the entity), and a digital signature (e.g., a public key of the entity signed by the blockchain 400 or the node of the blockchain 400).

In FIG. 4, RP_A Information may be the name, address, and contact information for a resource provider A. RP_A PubK may be a public key associated with resource provider A (the corresponding private key may be stored in the resource provider A's computer, access device, or beacon device. $Sign_{BC\_PK}$ (RP_A PubK) may be a digital signature that is the public key of resource provider A, signed by a private key of the blockchain. User_A Information may be information about a particular user (e.g. the name, contact information, and address). U_A PubK may be a public key associated with user A (the corresponding private key may be stored on User A's mobile communication device). $Sign_{BC\_PK}$ (U_A PubK) may be a digital signature that is the public key of user A, signed by a private key of the blockchain.

Figure 5:
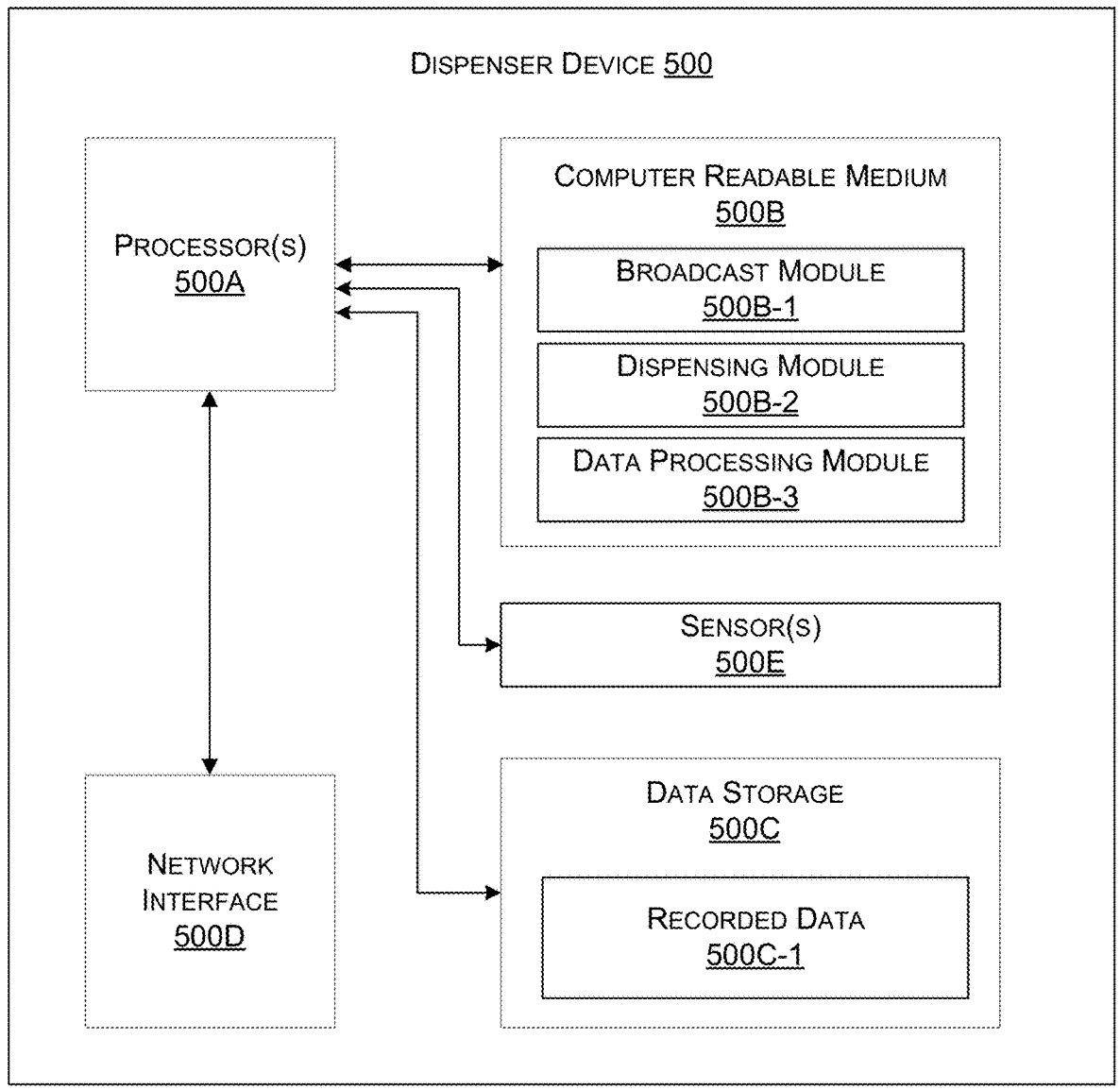
FIG. 5 shows a block diagram of dispenser device in accordance with at least one embodiment.

FIG. 5 shows a block diagram of dispenser device 500 in accordance with at least one embodiment. Dispenser device 500 may be an example of dispenser device 150 of FIG. 1. In some embodiments, dispenser device 500 may operate, at least in part, as a beacon device (e.g., the beacon device 120 of FIG. 1).

The dispenser device 500 may have one or more processors 500A, coupled to a computer readable medium 500B, data storage 500C, network interface 500D, and one or more sensors 500E.

The computer readable medium 500B may include a broadcast module 500B-1, a dispensing module 500B-2, and a data processing module 500B-3. It should be appreciated that in some embodiments, the functionality provided by the broadcast module 500B-1 may be alternatively provided by a beacon device (e.g., the beacon device 120 operating as a separate device in communication with the dispenser device 500).

The broadcast module 500B-1 may include instructions for causing the one or more processors 500A to retrieve recorded data 500C-1 (e.g., a credential associated with a user and/or a mobile communication device) from the data storage 500C. Once retrieved, the broadcast module 500B-1 may include instructions that when executed cause the one or more processors 500A to transmit at least some portion of the recorded data via a broadcasted signal (e.g., a globally addressed or unaddressed broadcast message). Accordingly, in some embodiments, the broadcast signal may encode a credential (e.g., a portion of the recorded data 500C-1). The data processing module 500B-3 may include instructions that, when executed, cause the one or more processors 500A to receive a confirmation message (e.g., from the federated platform 130 of FIG. 1) indicating that the user and/or mobile communication device is, or is not, authentic. If the confirmation message indicates that the user/mobile communication device is authentic, the data processing module 500B-3 may cause the dispensing module 500B-2 to perform operations to enable access to the resource by the user. By way of example, if the dispenser device 500 were a fuel dispenser, the fuel dispenser may be unlocked and/or allowed to dispense fuel for the user.

The dispensing module 500B-2 may be configured with instructions that, when executed, cause the one or more processors 500A to track/monitor the amount of the resource dispensed. The processors 500A may utilize one or more sensors 500E (e.g., an electronic gauge, cameras, infrared sensors, weight sensors, etc.), or any suitable mechanism to determine an amount of the resource dispensed. In addition, the dispensing module 500B-2 may include instructions to cause the processors 500A to determine (e.g., utilizing sensors 500E) that dispensing has ceased. In some embodiments, the dispensing module 500B-2 may be configured with instructions that cause the one or more processors 500A to calculate a total value corresponding to the amount of the resource dispensed. The total value may be calculated via any suitable predetermined protocol set. By way of example, the dispensing module 500B-2 may cause the processors 500A to utilize a predetermined mapping of the resource (or units of the resource) to a value. The total value may be computed based on multiplying the number of the resource (or the number of units of the resource) by the predetermined value.

In some embodiments, the data processing module 500B-3 may be configured to transmit the total value calculated above to a remote device (e.g., the mobile communication device 110 of FIG. 1). Upon transmitting the total value, upon determining that dispersing has ceased, or at any suitable time, the instructions of the dispensing module 500B-2, when executed, may cause the one or more processors 500A to once again lock and/or restrict access to the resource managed by the dispenser device 500 such that neither the user, nor any other user, may access the resource until such time as the user/other user is authenticated by the federated platform 130 of FIG. 1.

Methods according to embodiments of the invention will now be described with reference to FIGS. 6-8.

Figure 6:
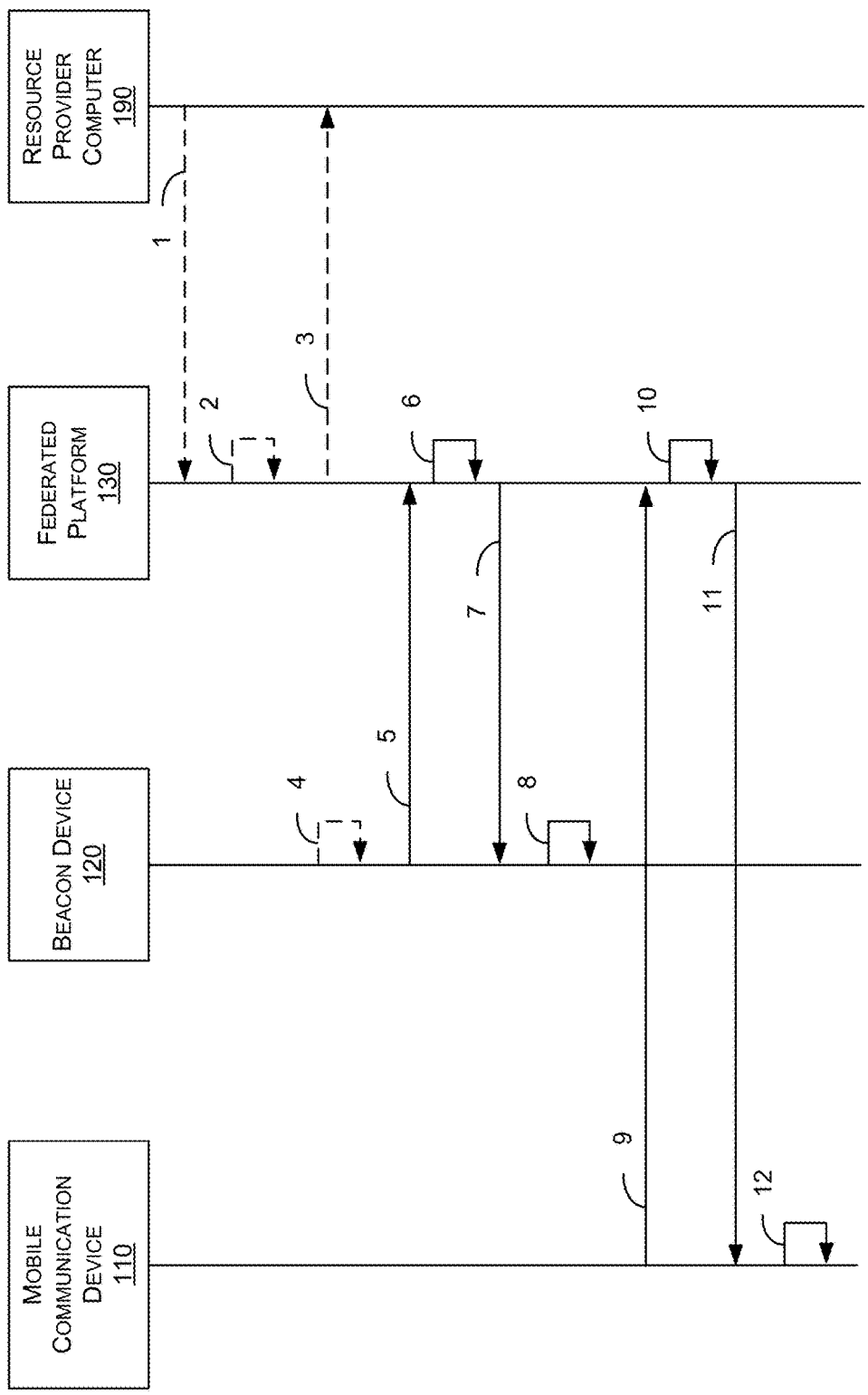
FIG. 6 shows a flow diagram illustrating an example registration process in accordance with at least one embodiment.

FIG. 6 shows a flow diagram illustrating an example registration process 600 in accordance with at least one embodiment. Prior to performing the steps in FIGS. 7, 8, and 9, the mobile communication device 110, and the resource provider computer 190 and/or the beacon device 120 may register with the federated platform 130. In some embodiments, the federated platform 130 may perform various verification processes before allowing each entity to register. For example, each entity may need to provide proof (e.g., identification, biometrics, device identifiers) that the devices being registered are associated with the entities that are purported to own or operate those devices. In the case of a user, the user may need to provide data to the federated platform 130 which shows that he or she actually owns the mobile communication device 110 and that any credentials associated with the mobile communication device 110 belong to the user.

If the federated platform operates a blockchain or a blockchain network, then in some embodiments, each individual device may generate a public/private key pair, and may transmit its public key to the blockchain. The blockchain (or one or more of the nodes of the blockchain) may then sign the public key, and may record the resulting digital signature in the blockchain, optionally along with other data associated with the individual device. The digital signature may be provided back to the device being registered. The credential that is used to establish the identity for that device may include the digital signature and the corresponding public key of that device.

By way of example, at step 1, the resource provider computer 190 associated with a resource provider may request a credential for itself and/or for the beacon device 120 (or the dispenser device 150 operating as a beacon device). The request may include a public key associated with the resource provider and/or the beacon device 120. In other embodiments, the resource provider computer could alternatively provide the federated platform 130 with a resource provider identifier and/or a beacon device identifier. The federated platform could validate that the resource provider and or beacon device is authentic and could store that resource provider identifier or beacon device identifier in a data storage. The federated platform 130 may receive this request at step 2 and generate a credential for the resource provider and/or the beacon device 120. The credential may include a public key associated with the resource provider or beacon device 120 as digitally signed with a private key of the federated platform 130. The public key of the resource provider or beacon device 120 and/or the generated credential may then be stored in an immutable data store such as the blockchain 400 of FIG. 4 which is managed by or accessible to the federated platform 130. The credential may be transmitted to the resource provider computer at step 3. At step 4, if the credential was requested for the beacon device 120, the credential may be stored at the beacon device 120 (or dispenser device 150 depending on the scenario) perhaps during a manufacturing process of the beacon device 120.

In some embodiments, the beacon device 120 (or dispenser device 150 operating as a beacon device) may request a credential rather than having one stored during a manufacturing process. Accordingly, at step 5, the beacon device 120 may transmit a request including a public key associated with the beacon device 120. This public key may part of a public/private key pair generated by the beacon device 120. Alternatively, the beacon device 120 may provide in the request a beacon device identifier. The federated platform 130 may receive this request at step 6 and generate a credential for the beacon device 120. In some embodiments, the credential may include a public key (or the beacon device identifier) associated with the beacon device 120 as digitally signed with a private key of the federated platform 130. The public key of the beacon device 120 or the beacon device identifier and/or the generated credential may then be stored in an immutable data store such as the blockchain 400 of FIG. 4 which is managed by or accessible to the federated platform 130. The credential may be transmitted to the beacon device 120 at step 7 and the beacon device 120 may store the credential at step 8.

Similarly, the mobile communication device 110 may request a credential from the federated platform 130. At step 9, the mobile communication device 110 may transmit a request including a public key associated with the mobile communication device 110. This public key may part of a public/private key pair generated by the mobile communication device 110. Alternatively, the mobile communication device 110 may provide in the request a mobile communication device identifier. The federated platform 130 may receive this request at step 10 and generate a credential for the mobile communication device 110. In some embodiments, the credential may include a public key (or the mobile communication device identifier) associated with the mobile communication device 110 as digitally signed with a private key of the federated platform 130. The public key of the mobile communication device 110 or the mobile communication device identifier and/or the generated credential may then be stored in an immutable data store such as the blockchain 400 of FIG. 4 which is managed by or accessible to the federated platform 130. The credential may be transmitted to the mobile communication device 110 at step 11 and the mobile communication device 110 may store the credential at step 12.

It should be appreciated that the steps 1-4 or 5-8 and steps 9-12 may be performed in any suitable order, not necessarily in the order depicted in FIG. 6. In some embodiments, the process 600 may occur before or during the time that the user and the mobile communication device 110 are present in the location 108 of FIG. 1.

Figure 7:
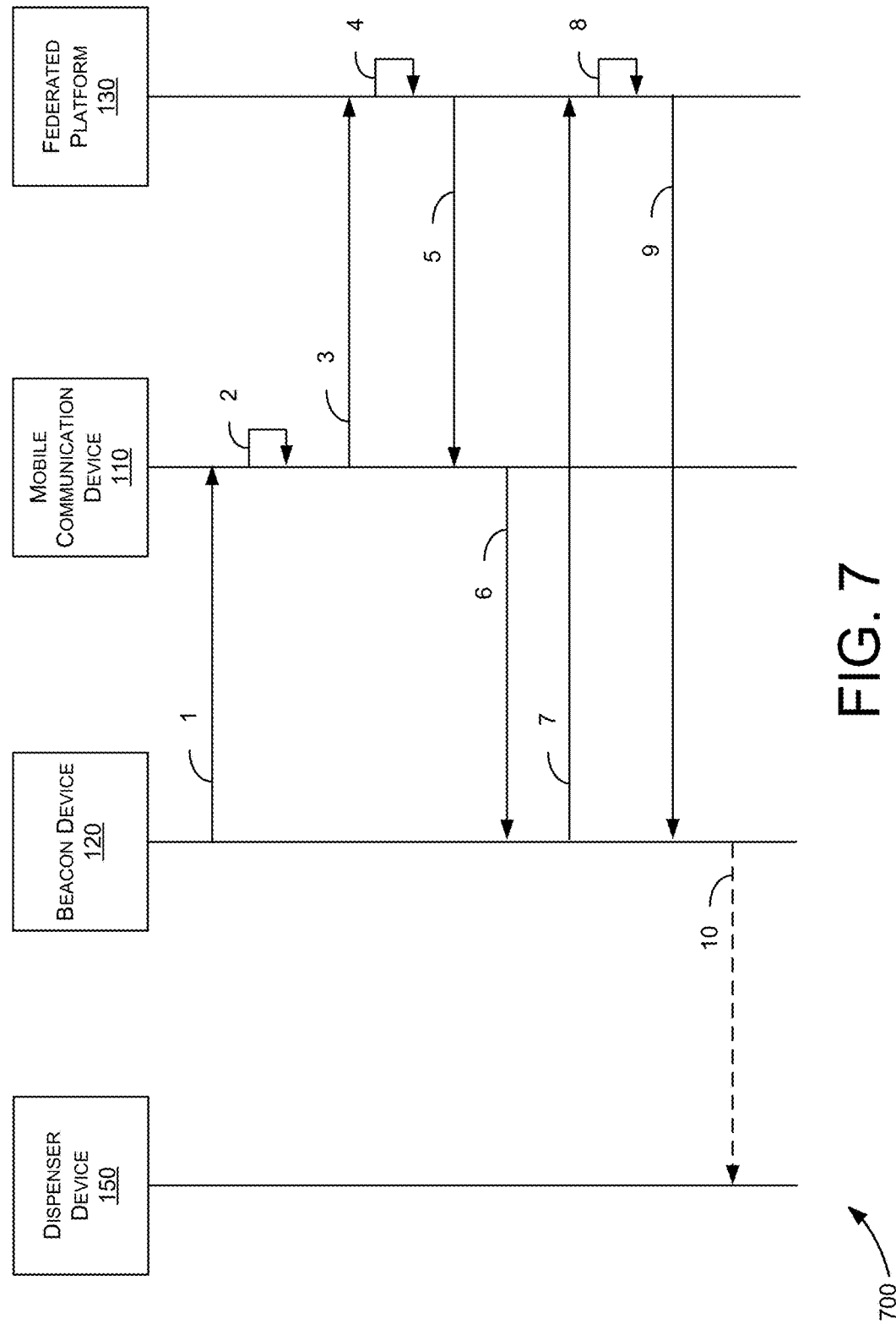
FIG. 7 shows a flow diagram illustrating an example authentication process in accordance with at least one embodiment.

FIG. 7 shows a flow diagram illustrating an example authentication process 700 in accordance with at least one embodiment.

At step 1, after the beacon device 120 and the mobile communication device 110 have registered with the federated platform 130, the beacon device 120 may transmit a broadcast signal to the mobile communication device 110. The broadcast signal (e.g., a BLE advertisement) may encode a first credential. The first credential may be associated with a first entity such as the resource provider or the first credential may be associated with the beacon device 120. For example, the first credential may include the public key of the resource provider/beacon device, the previously described digital signature, and an optionally an identifier for the first entity and/or the beacon device. The identifier for the first entity may include, for example, the name and location of the first entity (e.g., "Candy Dispenser 50002 at 133 at 921 E. Hillsdale Blvd, Foster City, CA").

At step 2, the mobile communication device 110 may receive that broadcast signal with the first credential. In response to receipt of the broadcast signal, the mobile communication device 110 may determine the federated platform 130. In some cases, the mobile communication device 110 may contain an application for the resource provider and the application may have the address of the federated platform 130. In at least one embodiment, the beacon device 120 may be one of many located at the location 108 of FIG. 1. Thus, in some embodiments, the mobile communication device 110 may be in receipt of multiple broadcast signals corresponding to multiple beacon device. Accordingly, in some embodiments, the mobile communication device 110 may be configured to provide a user interface to enable the user to select the particular beacon device with which he wishes to interact.

At step 3, the mobile communication device 110 transmits the received first credential (or the received first credential corresponding to the selected beacon device) to the federated platform 130.

At step 4, the federated platform receives the first credential and determines if the entity/device (e.g., the resource provider associated with the beacon device or the beacon device 120) associated with the first credential is authentic and has previously registered with the federated platform. The federated platform 130 may check its records (e.g., the blockchain 400) to determine if it can verify that the first credential provided by the beacon device 120 is associated with the public key and the digital signature stored in the blockchain 400. For example, the federated platform 130 can use its public key to verify the received digital signature by determining that it in fact previously signed the first entity's public key (or the beacon device's public key) to form the received digital signature. In other embodiments, instead of using asymmetric cryptographic techniques, the federated platform 130 may have previously created the digital signature by signing the resource provider's public key or beacon device's public key with a secret symmetric key. When the federated platform 130 receives the digital signature, it can use the symmetric key to determine that it previously signed the beacon device's public key. The federated platform 130 may then generate a confirmation message indicating that the first entity is authentic (or is not authentic) and transmit the confirmation message to the mobile communication device 110 at step 5.

In step 6, once the mobile communication device 110 has determined that it is in fact communicating with an authentic first entity (e.g., the beacon device 120), then the mobile communication device 110 may transmit a communication including a second credential for the mobile communication device 110 to the beacon device 120.

In step 7, the beacon device 120 transmits the second credential to the federated platform 130, and the federated platform 130 determines if the mobile communication device 110 is authentic. The federated platform 130 may check its records (e.g., the blockchain 400) to determine if it can verify that the identifier and/or credential provided by the beacon device 120 is associated with the public key and the digital signature associated with the mobile communication device 110. The federated platform 130 can use its public key to verify that it in fact previously signed the mobile communication device's public key to form the received digital signature (included in the second credential). In other embodiments, instead of using asymmetric cryptographic techniques, the federated platform 130 may have previously created the digital signature by signing the mobile communication device's public key with a secret symmetric key. When the federated platform 130 receives the digital signature, it can use the symmetric key to determine that it previously signed the mobile communication device's public key.

If it can verify and authenticate the mobile communication device 110, then the federated platform 130 can generate a confirmation message confirming the authenticity of the mobile communication device 110 and can transmit that confirmation message to the beacon device 120 in step 9. Note that steps 3-9 can be performed without any involvement or specific knowledge of the user.

At this point, the mobile communication device 110 and the beacon device 120 have determined that the other is authentic utilizing the federated platform 130. The beacon device 120 may then enable a resource to be dispensed. By way of example, the beacon device 120 may transmit and/or provide any suitable data to enable the dispenser device 150 to be utilized to dispense a resource for the user. It should be appreciated that in some embodiments, the dispenser device 150 may be operating as the beacon device 120. That is, the dispenser device 150 may be performing the operations described in connection with the beacon device 120. In these embodiments, the beacon device (e.g., the dispenser device 150) may enable itself to dispense a resource for the user.

Figure 8:
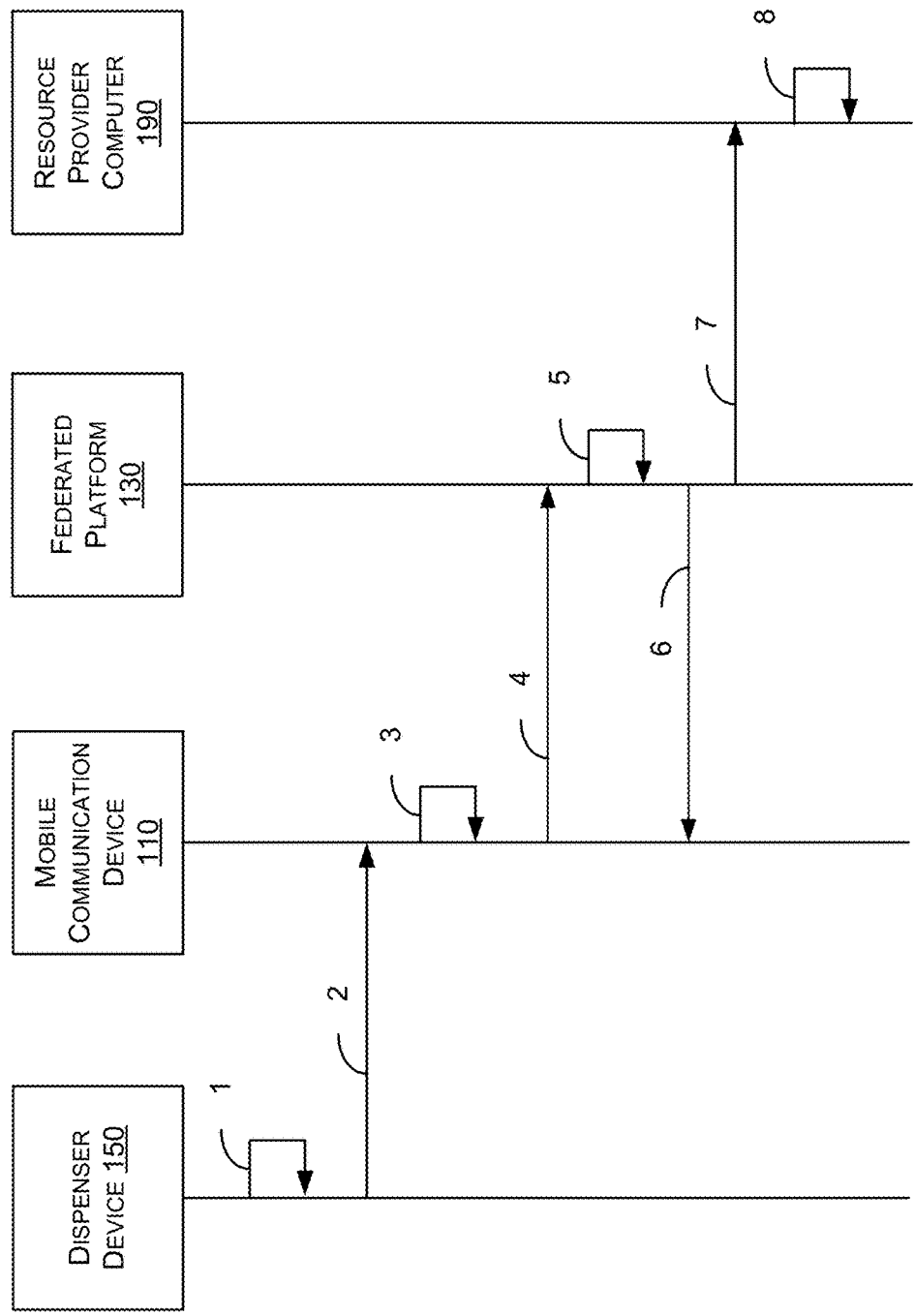
FIG. 8 shows a flow diagram illustrating an example interaction process in accordance with at least one embodiment.

FIG. 8 shows a flow diagram illustrating an example interaction process 800 in accordance with at least one embodiment. At step 1, the dispenser device 150 may perform any suitable operations for dispensing a resource managed by the dispenser device 150. In some embodiments, the resource may be any physical or digital item dispensable in any suitable unit. By way of example, the resource may include fuel (e.g., gas, hydrogen, electricity, etc.), candy, a digital game, or any suitable item capable of being dispensed by a dispenser device. The dispenser device 150 may be configured to determine when dispensing the resource has ceased. At such time, the dispenser device 150 may calculate a total value corresponding to the amount of the resource dispensed. In some embodiments, the total value may be calculated based at least in part on a predetermined value corresponding to the whole resource (e.g., a candy bar) or a unit of the resource (e.g., a gallon of gas).

Once a total amount is calculated, the dispenser device 150 may transmit interaction data to the mobile communication device 110 at step 2. The interaction data may include the total value as calculated by the dispenser device 150, an identifier of the resource provider, an identifier of the dispenser device 150, or any suitable combination of the above.

At step 3, the mobile communication device 110 may receive the interaction data. In some embodiments, receipt of the interaction data may cause the mobile communication device 110 to elicit biometric samples from a user of the mobile communication device 110 utilizing a biometric scanner or any suitable sensor such as a camera, fingerprint reader, retina scanner, iris scanner, or the like. The biometric samples captured from the user may be authenticated at the mobile communication device 110 (e.g., by the data collection module 224 of FIG. 2) based at least in part on any suitable authentication method such as comparing the biometric sample to previously stored credentials (e.g., the credentials 225). In some embodiments, based at least in part on receipt of the interaction data, the mobile communication device 110 may be configured to elicit user input such as a PIN and/or password (e.g., via the user interface 206 of FIG. 2) which may be then compared to previously determined credentials stored at the mobile communication device 110 (e.g., credentials 225) to authenticate the user at the mobile communication device 110.

If the mobile communication device 110 is able to authenticate the user, the mobile communication device 110 may add any suitable credential and/or identifier for the mobile communication device 110 to the received interaction data and transmit the combined interaction data to the federated platform 130 at step 4. It should be appreciated that in some embodiments, the interaction data may have already included the credential and/or identifier associated with the mobile communication device 110 as the dispenser device 150 may be configured to include such information in the interaction data.

At step 5, the federated platform 130 may be configured to record the interaction data at a data store (e.g., an immutable data store such as the blockchain 400) which is managed and/or accessible to the federated platform 130. At step 6, the federated platform 130 may be configured to provide an indication back to the mobile communication device 110 that the interaction data was successfully recorded. At step 7, the federated platform 130 may be configured to provide the interaction data (or some portion of the interaction data) to the resource provider computer 190. For example, the total value associated with the resource dispensed and the credential or other identifier associated with the user and/or mobile communication device 110 may be provided to the resource provider computer 190.

At step 8, the resource provider computer 190 may perform any suitable process for obtaining payment from the user, the payment corresponding to the total value of the dispensed resource. As a non-limiting example, the resource provider computer 190 may execute any suitable billing process for obtaining payment. For example, the resource provider computer 190 may utilize the credential and/or identified associated with the user and/or the mobile communication device 110 and provided by the federated platform 130 to retrieve contact information (e.g., a name, address, phone number, etc.) associated with a user. Utilizing such contact information, the resource provider computer 190 may generate physical or electronic billing information which may then be provided to the user (e.g., via email, text message, push notification, postal mail, etc.). If electronic in form, the resource provider computer 190 may be configured to transmit such billing information.

In some embodiments, the resource provider computer 190 may be configured to generate an authorization request message and transmit the authorization request message to the transaction processing network. For example, the resource provider computer 190 may format some portion of the interaction data into an ISO 8583 message that includes payment data (e.g., a personal account number (PAN), routing number and bank account, or any suitable payment token) associated with the user, as well as an amount of the purchase corresponding to the total value provided by the federated platform 130. In some embodiments, the payment data may have been previously provided by the user to the resource provider and made accessible to the resource provider computer 190.

The authorization request message may be transmitted to an authorizing entity computer directly, or via a transport computer and/or a transaction processing computer. The authorizing entity computer may transmit an authorization response message back to the resource provider computer 190 approving or disapproving of the transaction. The authorization response message may be transmitted from the authorizing entity computer via a transaction processing computer and/or a transport computer. At the end of the day or some other period of time, a clearing and settlement process can occur between the authorizing entity computer and an acquirer (e.g., a financial institution) of the resource provider operating the location 108 of FIG. 1.

Additional Embodiments

Figure 9:
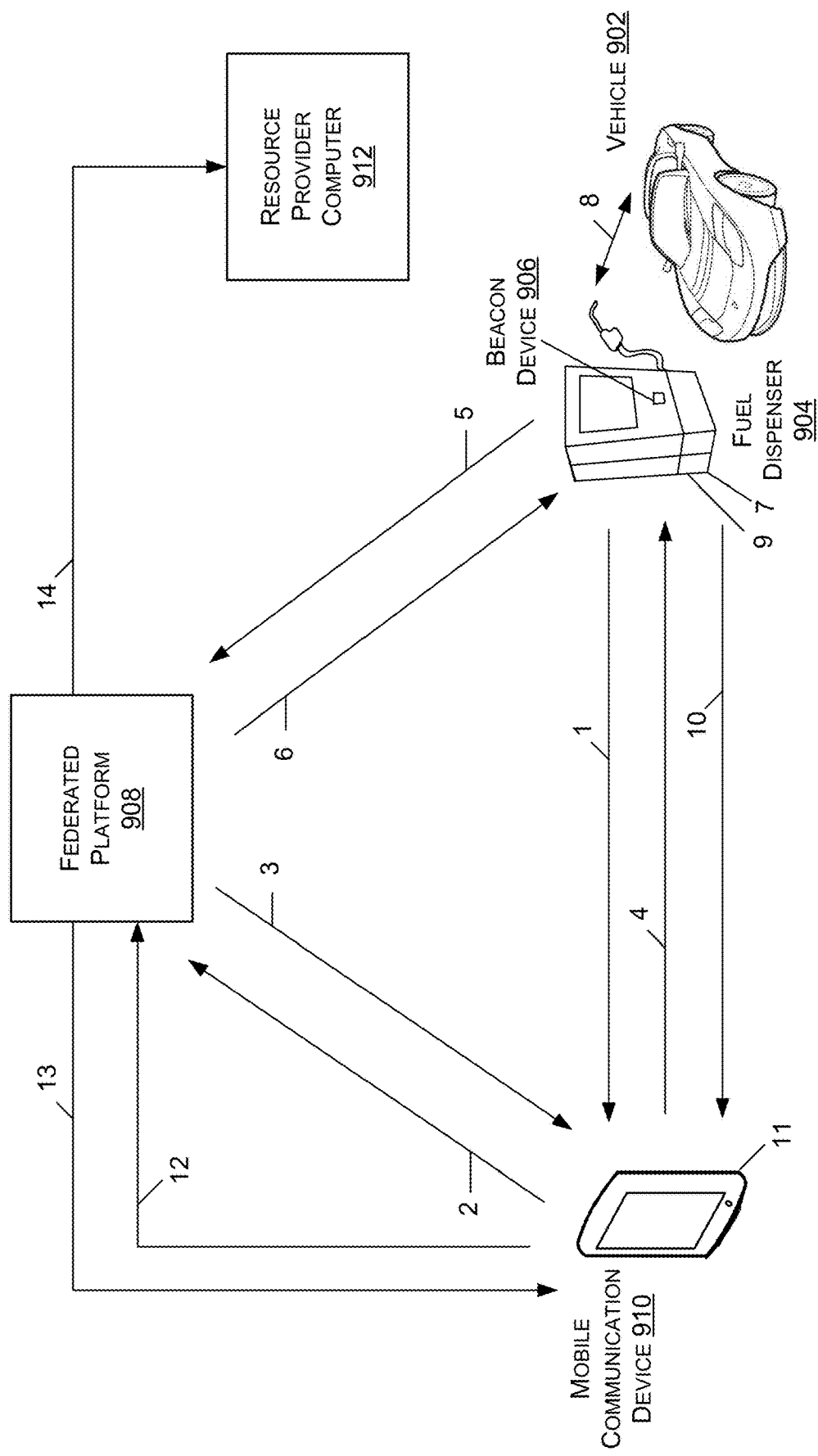
FIG. 9 shows a block diagram of another system and method in accordance with at least one embodiment.

Additional embodiments of the invention can be described with respect to FIG. 9. FIG. 9 shows a block diagram of another system and method in accordance with at least one embodiment. FIG. 9 shows an embodiment where a vehicle 902 may fill up with hydrogen fuel at a fuel dispenser 904 (e.g., an example of the dispenser device 150 of FIG. 1). The embodiment in FIG. 9 can be expanded to other situations as well, including accessing a particular locations or the purchase of some other such as food or gasoline or electronic entertainment. Additional details that can be applicable to FIG. 9 are described above, with respect to the other figures and some descriptions need not be repeated for the sake of brevity.

With reference to FIG. 9, the fuel dispenser 904 (e.g., an example of the dispenser device 150 of FIG. 1) may be analogous to or an example of the beacon device 120 of FIG. 1. In the example depicted in FIG. 9, the fuel dispenser 904 includes a beacon device 906 (e.g., an example of the beacon device 120 of FIG. 1) that is present at the fuel dispenser 904. It should be appreciated that the functionality of the beacon device 120 may alternatively be provided by the fuel dispenser 904 in some embodiments. The function of the federated platform 908 may be similar in some respects to the federated platform 130 of FIG. 1. The mobile communication device 910 may be analogous to the mobile communication device 110 in FIG. 1. In some embodiments, the mobile communication device 910 may be located within the vehicle 902 and/or the mobile communication device 910 may be a component of the vehicle 902.

In FIG. 9, prior to the performance of steps 1-14, a registration/verification process (e.g., the process 600 of FIG. 6) can occur between the fuel dispenser 904 (and/or the beacon device 906) and the federated platform 908, so that the fuel dispenser 904 and/or the beacon device 906 is registered with the federated platform 908. The federated platform 908 may be a blockchain system that maintain one or more blockchains.

In step 1, the beacon device 906 (or the fuel dispenser 904 operating as a beacon device), may transmit a broadcast signal to the mobile communication device 910. The broadcast signal may include a first credential associated with the fuel dispenser 904 (or beacon device 906) that was previously generated by the federated platform 908 during the process 600 performed between the fuel dispenser 904/beacon device 906 and the federated platform 908.

At step 2, the mobile communication device 910 may transmit the received first credential to the federated platform 908. Receipt by the federated platform 908 may cause the federated platform 908 to determine if the beacon device 906 (or the fuel dispenser 904 operating as a beacon device) is authentic and generates a first confirmation message confirming the authenticity of the beacon device 906 (or fuel dispenser 904 operating as a beacon device).

At step 3, the mobile communication device 910 may receive the first confirmation message. The confirmation message may indicate that the beacon device 906 (or the fuel dispenser 904 operating as a beacon device) is authentic (or that the fuel dispenser 904/beacon device 906 is not authentic).

If the confirmation message indicate that the beacon device 906 is authentic, indicating to the mobile communication device 910 that it is communicating with an authentic entity, the mobile communication device 910 may transmit a communication including a second credential for the mobile communication device 910 to the fuel dispenser 904/beacon device 906 at step 4.

At step 5, the beacon device 906 (or the fuel dispenser 904 operating as the beacon device) may transmit the second credential to the federated platform 608. Receipt by the federated platform 908 may cause the federated platform 908 to determine if the mobile communication device 910 is authentic and generates a second confirmation message confirming the authenticity of the mobile communication device 910.

At step 6, the beacon device 906 (or the fuel dispenser 904 operating as a beacon device) may receive the second confirmation message. The second confirmation message may indicate that the mobile communication device 910 is authentic (or that the mobile communication device 910 is not authentic).

At step 7, the beacon device 906 may perform any suitable operations to enable fuel to be dispensed by the user at the fuel dispenser 904. In embodiments, in which the fuel dispenser 904 is operating as a beacon device, the fuel dispenser itself may perform any suitable operations to enable fuel to be dispensed by the user.

At step 8, fuel (e.g., hydrogen fuel) may be pumped by the user to fill some fuel storage of the vehicle 902 to any suitable degree. The fuel dispenser 904 may monitor, track, or determine a total amount of the fuel dispensed at step 9. Based on this total amount, the fuel dispenser 904 may calculate a total value corresponding to the amount of fuel dispensed.

At step 10, the fuel dispenser 904 may then communicate with the mobile communication device 110 requesting the user's confirmation of intent to pay. The communication may include any suitable interaction data such as the total value calculated, an identifier for a resource provider associated with the fuel dispenser 904, a credential and/or other identifier corresponding to the fuel dispenser 904, a credential and/or other identifier corresponding to the user and/or the mobile communication device 910, the amount of the resource dispensed, and/or any suitable data.

At step 11, in response to receiving the interaction data, the user may be prompted enter an authentication credential such as a PIN, password, or biometric sample (e.g., voice, fingerprint, face image, etc.) to approve the interaction. The mobile communication device 910 may be configured to authenticate the user at the mobile communication device 910 utilizing the entered authentication credential.

If the user has been authenticated, the mobile communication device 910 may consider the interaction approved by the user. In response, the mobile communication device 910 may transmit interaction data to the federated platform 908 at step 12. Receipt of this interaction data may cause the federated platform 908 to record the interaction data in a suitable storage location (e.g., the blockchain 400 of FIG. 4 managed and/or accessible to the federated platform 908). The federated platform 908 may be configured to generate a message indicating that recordation of the interaction data was successful or unsuccessful.

At step 13, the federated platform 908 may be configured to transmit the generated message to the mobile communication device 910 which may then display some indication that the recordation was successful/unsuccessful.

At step 14, the interaction data may be communicated by the federated platform 908 to the resource provider computer 912. The resource provider computer 912 may be associated with the same resource provider that is associated with the fuel dispenser 904 and/or beacon device 906. The resource provider computer 912 may be an example of the resource provider computer 190 of FIG. 1. As described above, the resource provider computer 912 may perform any suitable process for obtaining payment from the user for the total value of the resource dispensed. By way of example, the resource provider computer 912 may perform any suitable operations discussed above in connection with step 8 of FIG. 8.

Technical Advantages

Embodiments of the invention have a number of advantages. As illustrated above, embodiments of the invention provide for a hands-free interaction method, whereby users can quickly and conveniently dispense some portion of a resource from a dispenser device without having to conduct a payment transaction prior to dispensing the resource. This may lead to a reduction in the delay experienced by the user prior to being able to dispense the resource. Additionally, the techniques discussed herein enable the interaction to occur by interacting with the dispenser device in a very minimal way (e.g., making a selection of a candy, pulling the pump lever, making a selection via an interface). In addition, prior to the interaction commencing, the user's mobile communication device and beacon device (or a dispenser device operating as a beacon device) automatically verify each other using federated platform. The interaction between the mobile communication device and the beacon device is trusted, even though they may not be proximate to each other and even though this may be the first time that they have interacted with each other.

It should be understood that any of the embodiments of the present invention can be implemented in the form of control logic using hardware (e.g. an application specific integrated circuit or field programmable gate array) and/or using computer software with a generally programmable processor in a modular or integrated manner. As used herein, a processor includes a single-core processor, multi-core processor on a same integrated chip, or multiple processing units on a single circuit board or networked. Based on the disclosure and teachings provided herein, a person of ordinary skill in the art will know and appreciate other ways and/or methods to implement embodiments of the present invention using hardware and a combination of hardware and software.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents. For example, although the described embodiments mention the use of electronic records in order to assess a risk level of an action, an electronic record can also be used to access data or other services. For example, electronic records may be used to gain access to a location or service (e.g., a train ride or concert). In this example, the electronic record may include a transaction record which indicates that a ticket has been associated with an account.

One or more features from any embodiment may be combined with one or more features of any other embodiment without departing from the scope of the invention.

A recitation of "a", "an" or "the" is intended to mean "one or more" unless specifically indicated to the contrary.

All patents, patent applications, publications, and descriptions mentioned above are herein incorporated by reference in their entirety for all purposes. None is admitted to be prior art.

What is claimed is:

1. A method comprising:
receiving, from a beacon device associated with a dispenser device, a broadcast signal that encodes a first credential associated with the beacon device, by a mobile communication device operated by a user;
transmitting, by the mobile communication device, the first credential to a federated platform configured to manage a blockchain that stores public keys of a plurality of devices, respectively, and a plurality of digital signatures formed by the federated platform and respectively associated with the plurality of devices upon registration of the plurality of devices with the federated platform, wherein the first credential comprises a first public key of the beacon device and a first digital signature, wherein the federated platform determines if the beacon device is authentic by verifying whether the first digital signature corresponds to a digital signature that is associated with the beacon device and was stored in the blockchain upon registration of the beacon device with the federated platform, and generates a first confirmation message confirming an authenticity of the beacon device based on the determining that the beacon device is authentic; and
transmitting, by the mobile communication device to the beacon device, a second credential for the mobile communication device based on the first confirmation message being received by the mobile communication device from the federated platform, the second credential comprising a second public key of the mobile communication device and a second digital signature,
wherein the beacon device transmits the second credential to the federated platform that determines if the mobile communication device is authentic by verifying whether the second digital signature corresponds to a digital signature that is associated with the mobile communication device and was stored in the blockchain upon registration of the mobile communication device with the federated platform, generates a second confirmation message confirming the authenticity of the mobile communication device based on the determining that the mobile communication device is authentic, and transmits, to the beacon device, the second confirmation message indicating that the mobile communication device is authentic,
wherein receiving the second confirmation message by the beacon device from the federated platform allows the dispenser device to dispense a resource for the user, and
wherein the beacon device and the mobile communication device are included in the plurality of devices.

2. The method of claim 1, wherein the beacon device is included in the dispenser device, and
wherein the dispenser device is a fuel dispenser.

3. The method of claim 1, further comprising:
receiving, by the mobile communication device from the dispenser device, interaction data comprising a total value corresponding to a total amount of the resource dispensed by the dispenser device.

4. The method of claim 3, wherein the receiving the interaction data causes the mobile communication device to initiate a biometric authentication process for authenticating the user at the mobile communication device.

5. The method of claim 3, wherein the receiving the interaction data causes the mobile communication device to initiate a recording process with the federated platform, the recording process comprising recording the total value in the blockchain.

6. The method of claim 5, wherein the recording process causes the federated platform to transmit the total value of the interaction data to a resource provider computer associated with a first entity, and
wherein the beacon device is associated with the first entity.

7. The method of claim 1, further comprising:
requesting, by the mobile communication device, the second credential from the federated platform during a registration process conducted with the federated platform;
receiving, by the mobile communication device, the second credential; and
storing, by the mobile communication device, the second credential in a memory of the mobile communication device,
wherein the federated platform stores the second credential in the blockchain.

8. The method of claim 1, wherein the first digital signature is formed by the federated platform using the first public key of the beacon device during the registration of the beacon device with the federated platform, and
the second digital signature is formed by the federated platform using the second public key of the mobile communication device during the registration of the mobile communication device with the federated platform.

9. The method of claim 1, wherein:
the beacon device is one of a plurality of beacon devices associated with a plurality of dispenser devices, respectively, and
the receiving the broadcast signal further comprises:
receiving, from the plurality of beacon devices, a plurality of broadcast signals, and
receiving a user input selecting the beacon device through a user interface provided in the mobile communication device.

10. A system comprising:
a federated platform configured to manage a blockchain that stores public keys of a plurality of devices, respectively, and a plurality of digital signatures formed by the federated platform and respectively associated with the plurality of devices upon registration of the plurality of devices with the federated platform;
a beacon device associated with a dispenser device; and
a mobile communication device comprising:
one or more processors, and
one or more memories storing computer-executable instructions that, when executed by the one or more processors, cause the one or more processors to execute a method including:
receiving, from the beacon device, a broadcast signal that encodes a first credential associated with the beacon device; and
transmitting the first credential to a to the federated platform, wherein the first credential comprises a first public key of the beacon device and a first digital signature,
wherein the federated platform determines if the beacon device is authentic by verifying whether the first digital signature corresponds to a digital signature that is associated with the beacon device and was stored in the blockchain upon registration of the beacon device with the federated platform, and generates a first confirmation message confirming an authenticity of the beacon device based on the determining that the beacon device is authentic, and
wherein the method further includes transmitting, to the beacon device, a second credential for the mobile communication device based on the first confirmation message being received by the mobile communication device from the federated platform, the second credential comprising a second public key of the mobile communication device and a second digital signature,
wherein the beacon device transmits the second credential to the federated platform that determines if the mobile communication device is authentic by verifying whether the second digital signature corresponds to a digital signature that is associated with the mobile communication device and was stored in the blockchain upon registration of the mobile communication device with the federated platform, generates a second confirmation message confirming the authenticity of the mobile communication device based on the determining that the mobile communication device is authentic, and transmits, to the beacon device, the second confirmation message indicating that the mobile communication device is authentic,
wherein receiving the second confirmation message by the beacon device from the federated platform allows the dispenser device to dispense a resource for a user associated with the mobile communication device, and
wherein the beacon device and the mobile communication device are included in the plurality of devices.

11. The system of claim 10, wherein the method further includes:
receiving, by the mobile communication device from the dispenser device, interaction data comprising a total value corresponding to a total amount of the resource dispensed by the dispenser device.

12. The system of claim 11, wherein the receiving the interaction data causes the mobile communication device to initiate a biometric authentication process for authenticating the user at the mobile communication device.

13. The system of claim 11, wherein the receiving the interaction data causes the mobile communication device to initiate a recording process with the federated platform, the recording process including recording the total value in the blockchain.

14. The system of claim 10, wherein the method further includes:
requesting the second credential from the federated platform during a registration process conducted with the federated platform;
receiving the second credential; and
storing the second credential in the one or more memories, and
wherein the federated platform stores the second credential in the blockchain.

15. The system of claim 10, wherein the first digital signature is formed by the federated platform using the first public key of the beacon device during the registration of the beacon device with the federated platform, and
the second digital signature is formed by the federated platform using the second public key of the mobile communication device during the registration of the mobile communication device with the federated platform.

16. The system of claim 10, further comprising a user interface,
wherein the beacon device is one of a plurality of beacon devices associated with a plurality of dispenser devices, respectively, and
wherein the receiving the broadcast signal further includes:
receiving, from the plurality of beacon devices, a plurality of broadcast signals, and receiving a user input selecting the beacon device through the user interface.

17. A federated platform comprising:

one or more processors; and a non-transitory computer readable medium storing computer-executable instructions that, when executed by the one or more processors, cause the one or more processors to execute a method including:

receiving, from a mobile communication device operated by a user, a first credential that is received by the mobile communication device in a broadcast signal being broadcast by a beacon device associated with a dispenser device, wherein the first credential comprises a first public key of the beacon device and a first digital signature;

determining if the beacon device is authentic by verifying whether the first digital signature corresponds to a digital signature associated with the beacon device and stored in a blockchain managed by the federated platform upon registration of the beacon device with the federated platform;

based on the determining that the beacon device is authentic, generating a first confirmation message confirming an authenticity of the beacon device;

transmitting the first confirmation message to the mobile communication device that, upon receiving the first confirmation message, transmits a second credential for the mobile communication device to the beacon device, the second credential comprising a second public key of the mobile communication device and a second digital signature;

receiving, from the beacon device, the second credential for the mobile communication device;

determining if the mobile communication device is authentic by verifying whether the second digital signature corresponds to a digital signature associated with the mobile communication device and stored in the blockchain upon registration of the mobile communication device with the federated platform;

generating a second confirmation message confirming the authenticity of the mobile communication device based on the determining that the mobile communication device is authentic; and transmitting, to the beacon device, the second confirmation message indicating that the mobile communication device is authentic, wherein receiving the second confirmation message by the beacon device allows the dispenser device to dispense a resource for the user.

18. The federated platform of claim 17, wherein the method further includes:

receiving, from the mobile communication device, interaction data comprising a total value corresponding to a total amount of the resource dispensed by the dispenser device;

recording the total value in the blockchain; and transmitting the total value to a resource provider computer associated with a first entity, and wherein the beacon device is associated with the first entity.

19. The federated platform of claim 17, wherein the method further includes:

performing registration with a plurality of devices; and in response to the registration being performed, respectively associating a plurality of credentials with the plurality of devices; and storing the plurality of credentials associated with the plurality of devices, and wherein the beacon device and the mobile communication device are included in the plurality of devices.

20. The federated platform of claim 19, wherein the method further includes:

generating the first digital signature using the first public key of the beacon device during the registration with the beacon device; and generating the second digital signature using the second public key of the mobile communication device during the registration with the mobile communication device.

* * * * *

UNITED STATES PATENT AND TRADEMARK OFFICE
CERTIFICATE OF CORRECTION

PATENT NO. : 12,380,441 B2
APPLICATION NO. : 18/152645
DATED : August 5, 2025
INVENTOR(S) : Quan Wang Page 1 of 1

It is certified that error appears in the above-identified patent and that said Letters Patent is hereby corrected as shown below:

In the Claims

In Claim 10, Column 23, Line 50, please remove "to a to the" and insert --to the--

Signed and Sealed this
Eleventh Day of November, 2025

John A. Squires
*Director of the United States Patent and Trademark Office*